United States Patent
Ishizaki et al.

(10) Patent No.: US 6,313,852 B1
(45) Date of Patent: Nov. 6, 2001

(54) SCHEDULING MANAGEMENT SYSTEM AND ITS PROCESS CONTROL METHOD

(75) Inventors: Hiroshi Ishizaki, Ichikawa; Norihito Suganuma, Yokosuka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/225,309

(22) Filed: Jan. 5, 1999

(30) Foreign Application Priority Data

Jan. 7, 1998 (JP) .................................................. 10-001323

(51) Int. Cl.⁷ ........................................................ G06F 3/00
(52) U.S. Cl. ........................... 345/751; 345/716; 345/744; 345/963; 345/769; 345/971
(58) Field of Search ................................. 345/963, 339, 345/348, 331; 705/8, 9

(56) References Cited

U.S. PATENT DOCUMENTS

| | | | |
|---|---|---|---|
| 5,528,745 | * 6/1996 | King et al. | 345/326 |
| 5,659,768 | * 8/1997 | Forbes et al. | 707/517 |
| 5,860,067 | * 1/1999 | Onda et al. | 705/9 |
| 5,895,451 | * 4/1999 | Yamade et al. | 705/8 |
| 5,936,625 | * 8/1999 | Kahl et al. | 345/351 |
| 5,943,051 | * 8/1999 | Onda et al. | 345/341 |
| 6,073,110 | * 6/2000 | Rhodes et al. | 705/8 |

FOREIGN PATENT DOCUMENTS

| | | |
|---|---|---|
| 1-173259 | 7/1989 | (JP) . |
| 6-110646 | 4/1994 | (JP) . |
| 10-32928 | 2/1998 | (JP) . |

\* cited by examiner

*Primary Examiner*—Raymond J. Bayerl
*Assistant Examiner*—Kieu D. Vu
(74) *Attorney, Agent, or Firm*—Mattingly, Stanger & Malur, P.C.

(57) ABSTRACT

A simple and easy-to-memorize operation method for a scheduling management system is provided to perform main tasks such as referring to schedules of a selected member or a selected date. A software component indicating a schedule, a member, or a date is moved to any one of components constituting a GUI screen, and when the software component is superposed upon another component, the motion destination component constituting the GUI screen judges the type of the superposed software component to select a process to be performed. Main tasks can be performed by a simple operation method through superposition of software components.

3 Claims, 16 Drawing Sheets

FIG. 2

| ITEM NUMBER | USER (GROUP) ID 201 | USER (GROUP) NAME 202 | TYPE 203 | PARENT ID 204 |
|---|---|---|---|---|
| 1 | JIGYOBU001 | OPERATION DIVISION A | GROUP | |
| 2 | BUSYO001 | DEPARTMENT a | GROUP | JIGYOBU001 |
| 3 | BUSYO002 | DEPARTMENT b | GROUP | JIGYOBU001 |
| 4 | GROUP001 | GROUP 1 | GROUP | BUSYO002 |
| 5 | USER001 | Mr. A | INDIVIDUAL | GROUP001 |
| 6 | USER002 | Mr. B | INDIVIDUAL | GROUP001 |
| . . | . . | . . | . . | . . |

FIG. 3

| ITEM NUMBER | USER ID 301 | DATE 302 | START TIME 303 | END TIME 304 | WORK MATTER 305 | VISITING SITE 306 |
|---|---|---|---|---|---|---|
| 1 | USER001 | 97/10/14 | 10:00 | 14:00 | SECTION MEETING | CONFERENCE ROOM 1 |
| 2 | USER001 | 97/10/28 | 10:00 | 12:00 | REVIEW | CONFERENCE ROOM A |
| 3 | USER002 | 97/10/15 | 9:00 | 13:00 | DEPARTMENT MEETING | CONFERENCE ROOM 2 |
| 4 | USER002 | 97/10/28 | 13:00 | 16:00 | TRAINING | CONFERENCE ROOM B |
| . . | . . | . . | . . | . . | . . | . . |

FIG. 4

| ITEM NUMBER | USER ID | DATE | START TIME | END TIME | WORK MATTER | VISITING SITE | OPERATION PRIVILEGE |
|---|---|---|---|---|---|---|---|
| | 404 | 405 | | | 403 | 402 | 401 |
| 1 | USER001 | 97/10/28 | 10:00 | 12:00 | REVIEW | CONFERENCE ROOM A | VALID |
| 2 | USER002 | 97/10/28 | 13:00 | 16:00 | TRAINING | CONFERENCE ROOM B | INVALID |
| .. | .. | .. | .. | .. | .. | .. | .. |

FIG. 5A

| ITEM NUMBER | USER ID (501) | VISITING SITE (502) |
|---|---|---|
| 1 | USER001 | CONFERENCE ROOM A |
| 2 | USER001 | CONFERENCE ROOM B |
| 3 | USER001 | SEMINAR ROOM |
| 4 | USER002 | CUSTOMER SITE |
| .. | .. | .. |

FIG. 5B

| ITEM NUMBER | USER ID (504) | WORK MATTER (503) |
|---|---|---|
| 1 | USER001 | PROGRESS CONFERENCE |
| 2 | USER001 | DESIGN REVIEW |
| 3 | USER001 | TRAINING MEETING |
| 4 | USER002 | DEMO |
| .. | .. | .. |

FIG. 6A

| ITEM NUMBER | USER ID | VISITING SITE | ... |
|---|---|---|---|
| | 601 | 602 | |
| 1 | USER001 | CONFERENCE ROOM A | |
| 2 | USER001 | CONFERENCE ROOM B | ... |
| 3 | USER001 | SEMINAR ROOM | |
| ⋮ | ⋮ | ⋮ | |

FIG. 6B

| ITEM NUMBER | USER ID | WORK MATTER | ... |
|---|---|---|---|
| | 603 | 604 | |
| 1 | USER001 | PROGRESS CONFERENCE | |
| 2 | USER001 | DESIGN REVIEW | ... |
| 3 | USER001 | TRAINING MEETING | |
| ⋮ | ⋮ | ⋮ | |

FIG. 7
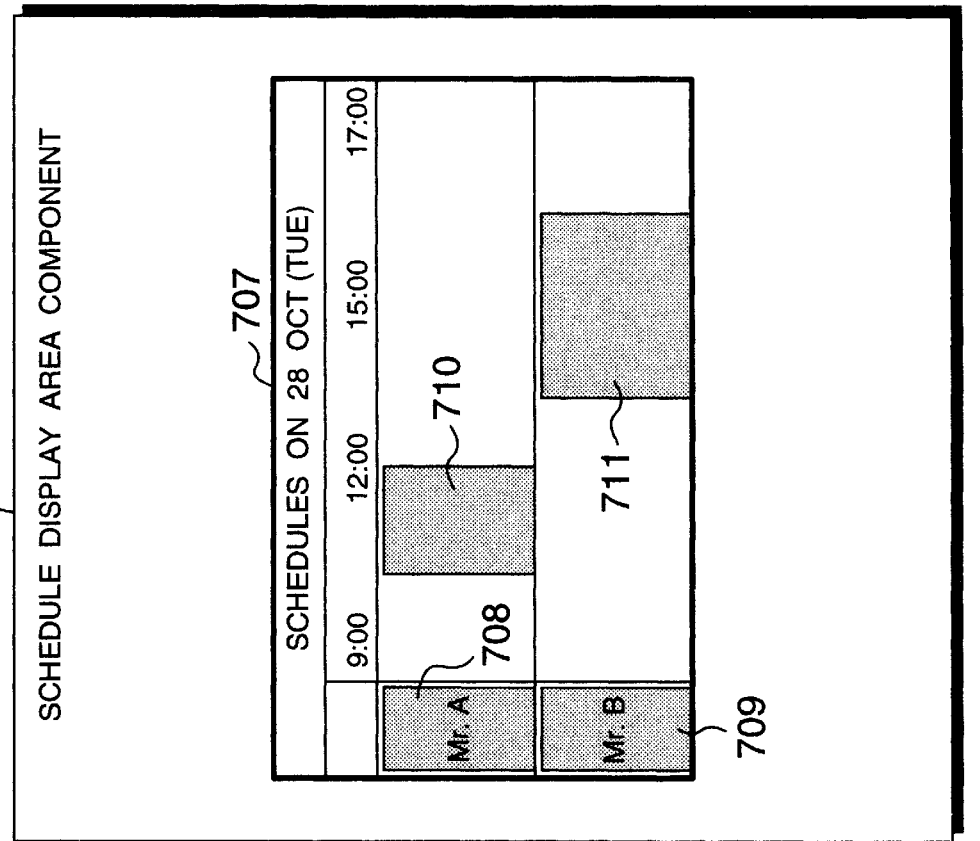
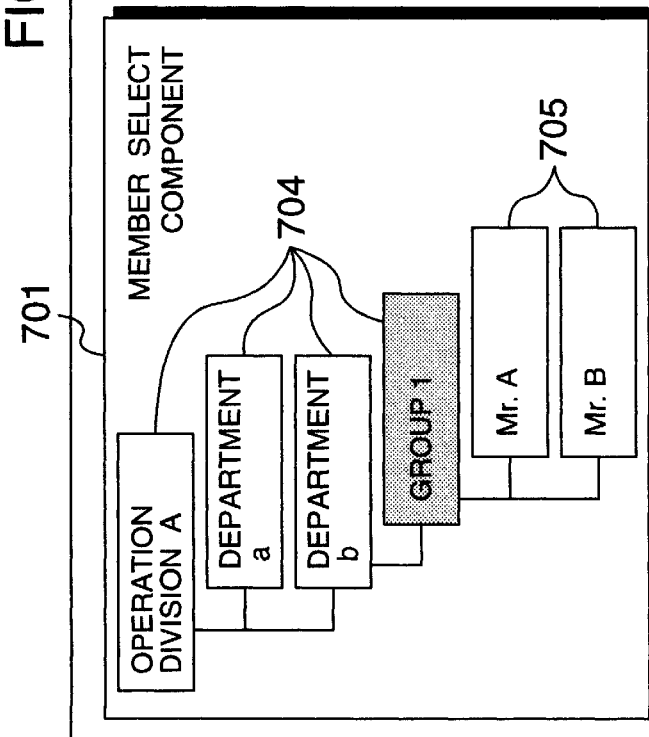

SCHEDULING MANAGEMENT SYSTEM AND ITS PROCESS CONTROL METHOD

BACKGROUND OF THE INVENTION

The present invention relates to a scheduling management system and more particularly to a process using cooperation between software components.

In a conventional scheduling management system, for example, as disclosed in JP-A-1-173259, when some task is to be performed, it is necessary to designate a task by using an icon or menu displayed on a screen. In a recent scheduling management system, the number of icons and menus is increasing as the functions of the system become abundant. It is therefore cumbersome to find an icon or menu to be designated when some task is performed. It is also very tired to memorize the layout of menus and icons.

Most of a conventional scheduling management system request a user to select a process to be performed by using a menu or the like, even if the process is a main process having a high use frequency such as reference to scheduling data of a member and reference to scheduling data of a specific date, and the user is requested to perform cumbersome operations. Since most of main processes are selected by using a menu or the like, it is necessary to memorize which menu is positioned in what area, and it takes a long time to become accustomed with operations.

As above, a conventional scheduling management system does not consider much the operation performance of the system. Therefore it is difficult to understand the operation method and it takes a labor until a user becomes accustomed with the operations.

SUMMARY OF THE INVENTION

It is an object of the present invention to solve the above problems and provide simplified scheduling operation means.

A scheduling management system of this invention comprises: a scheduling data storage device for storing scheduling data; a member information storage device for storing member information; a calendar information storage device for storing calendar information; a display device for displaying a GUI screen containing a plurality of components; an input device such as a pointing device for designating an arbitrary position on the GUI screen; and an inter-component communication control unit for, if a movable software component on a certain component constituting the GUI screen is selected with the input device and is moved and superposed upon another component constituting the GUI screen, notifying the other motion destination component of the superposed software component, wherein when the software component on one component constituting the GUI screen is superposed on another component, a process is controlled in accordance with the type of the software component notified by the inter-component communication control unit.

BRIEF DESCRIPTION OF THE DRAWINGS

FIG. 2 is a diagram showing the data structure of member information.

FIG. 3 is a diagram showing the structure of scheduling data stored in a schedule storage device.

FIG. 4 is a diagram showing the structure of scheduling data stored in a scheduling data storage buffer.

FIGS. 5A and 5B are diagrams showing the data structures of visiting site information and work matter information stored in a visiting site/work matter storage device.

FIGS. 6A and 6B are diagrams showing the data structures of visiting site information and work matter information stored in a visiting site/work matter storage buffer.

FIG. 7 shows an example of a displayed member schedule.

DESCRIPTION OF THE PREFERRED EMBODIMENTS

Figure 1:
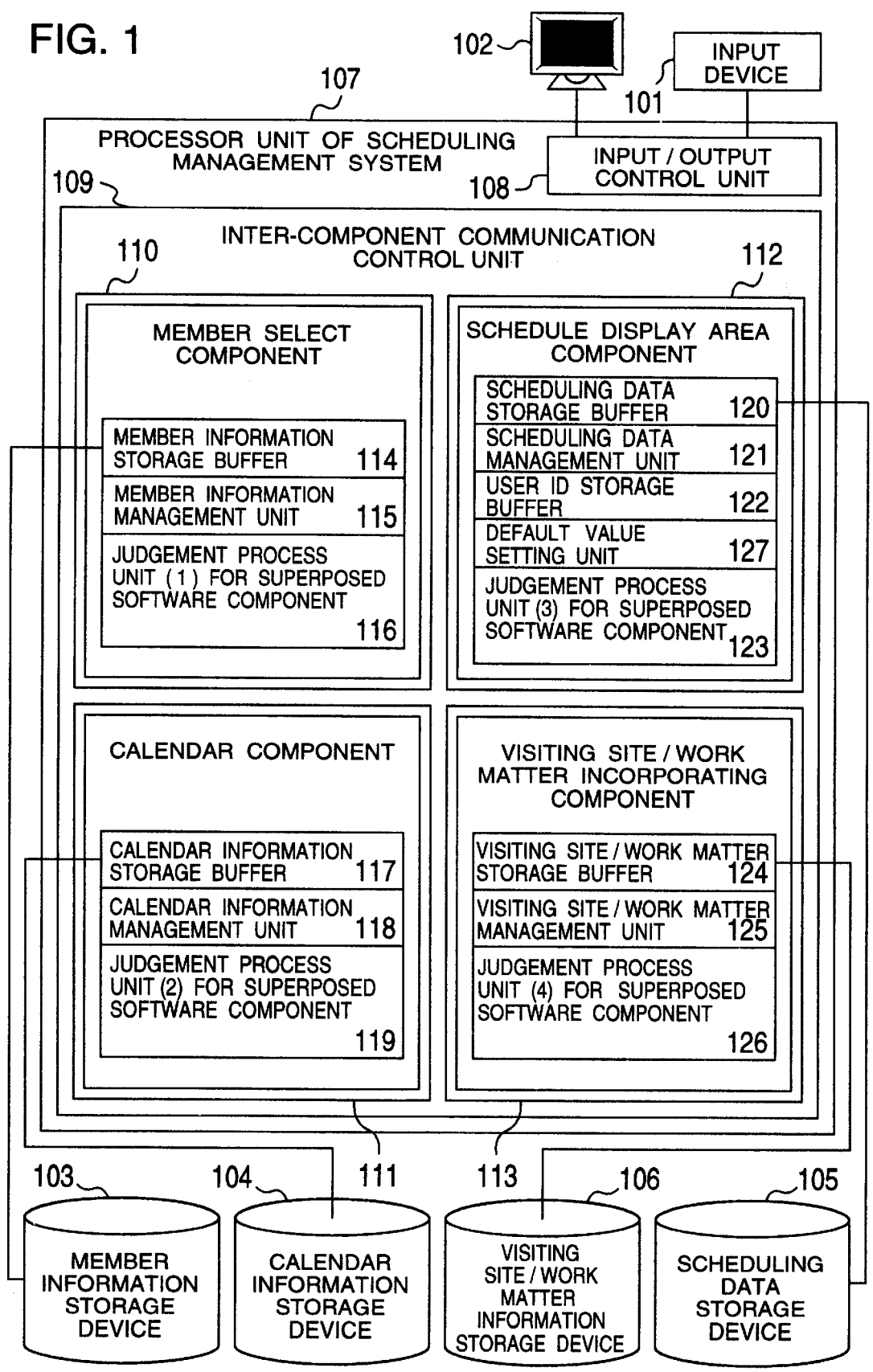
FIG. 1 is a diagram showing the configuration of a scheduling management system according to an embodiment of the invention.

FIG. 1 is a diagram showing the configuration of a scheduling management system according to an embodiment of the invention. The scheduling management system includes an input device 101 such as a pointing device for inputting position information, a display unit 102, a member information storage device 103, a calendar information storage device 104, a scheduling data storage device 105, a visiting site/work matter storage device 106, and a processor unit 107.

The member information storage device 103 stores, as shown in FIG. 2, member information constituted of items including a user ID 201, a user name 202, a member type 203, and a parent ID 204. The member type 203 is a flag for judging whether the member is an individual or a group which is a collection of individuals. The parent ID 204 is an item necessary for hierarchically managing the member information. For example, the hierarchical structure of members shown in FIG. 7 on a member select component 701 can be expressed by the data structure shown in FIG. 2.

The calendar storage device 104 stores calendar information.

The scheduling data storage device 105 stores, as shown in FIG. 3, scheduling data constituted of items including a user ID 301, a date 302, a start time 303, an end time 304, a work matter 305, and a visiting site 306. The user ID 301 is an item indicating an owner of schedules. The visiting site 305 is an item indicating a site where the work matter of a schedule is executed.

The visiting site/work matter information storage device 106 stores, as shown in FIG. 5A, visiting site information containing a user ID 501 and a visiting site 502 and work matter information containing a user ID 504 and a work matter 503. If visiting site information and work matter information frequently used are registered in advance, such information can be incorporated when a new schedule is registered, so that the same visiting site and work matter are not necessary to enter from a keyboard.

Next, the processor unit 107 of the scheduling management system will be described. The processor unit 107 includes an input/output control unit 108, an inter-component communication control unit 109, a member elect component 110, a calendar component 111, a chedule display area component 112, and a visiting site/work matter incorporating component 113.

The input/output control unit 108 supplies the processor unit 107 with information entered from the put device 101 such as a pointing device, and displays data supplied from the processor unit on the display unit 102.

The inter-component communication control unit 109 has a function of informing, when a software component constituting a GUI screen is moved and superposed upon another software component, that the software component was superposed upon the partner software component. With this function, cooperation between components constituting the GUI screen can be achieved.

The member select component 110 includes a member information storage buffer 114, a member information management unit 115, and a judgement process unit (1) 116 for judging a superposed software component. The member information storage buffer 114 temporarily stores member information. The member information management unit 115 acquires member information stored in the member information storage device 103 such as shown in FIG. 2, and stores the acquired member information in the member information storage buffer 114. The member information management unit 115 also performs a process of hierarchically displaying the software component representing the member information stored in the member information storage buffer 114, on the member select components 701 as shown in FIG. 7. Reference numeral 704 represents a software component showing group members, and reference numeral 705 represents a software component showing individual members. Upon a notice of a software component superposed upon the member select component from the inter-component communication control unit 109, the judging process unit (1) 116 for judging a superposed software component selects a process in accordance with the type of the notified software component.

The calendar component 111 includes a calendar information storage buffer 117, a calendar information management unit 118, and a judging process unit (2) 119 for judging a superposed software component. The calendar information storage buffer 117 temporarily stores calendar information including year, month, day, and day of the week. The calendar information management unit 118 acquires calendar information from the calendar information storage device 104 and stores it in the calendar information storage buffer 117. The calendar information management unit 118 performs a process of displaying in a calendar format the software component representing date information stored in the calendar information storage buffer 117, on the calendar component 702 such as shown in FIG. 7. Reference numeral 706 represents a software component showing date information. Upon a notice of a software component superposed upon the calendar component from the inter-component communication control unit 109, the judging process unit (2) 119 for judging a superposed software component selects a process in accordance with the type of the notified software component.

The schedule display area component 112 includes a scheduling data storage buffer 120, a scheduling data management unit 121, a user ID storage buffer 122, a judgement process unit (3) 123 for judging a superposed software component, and a default value setting unit 127. The scheduling data storage buffer 120 temporarily stores scheduling data acquired by the scheduling data management unit 121 from the scheduling data storage device 105 and added with a new item of operation privilege such as shown in FIG. 4. The operation privilege 401 is an item used for setting whether a privilege of changing or deleting the scheduling data is given to a user. The scheduling data management unit 121 performs a process of displaying the software component representing the scheduling data stored in the scheduling data storage buffer 120, on the schedule screen 707 of the schedule display area component 703 such as shown in FIG. 7. The software component representing the member whose schedule is to be referred to is also displayed on the schedule display 707. The schedule display area component 703 shown in FIG. 7 is a display example of the scheduling data such as shown in FIG. 4 and stored in the scheduling data storage buffer 120. Reference numerals 710 and 711 represent software components showing the scheduling data of Mr. A and Mr. B. Reference numerals 708 and 709 represent software components showing the members Mr. A and Mr. B. The scheduling data management unit 121 also performs processes regarding schedule reference, registration, change, and deletion. The user ID storage buffer 122 temporarily stores a user ID entered when the user starts using the scheduling management system.

This user ID is used when the operation privilege 401 of the scheduling data is set or in other cases. Generally, the schedule operation privilege 401 is set by considering whether the schedule is owned by the user. It is therefore necessary for the system to know who is the user. Upon a notice of a software component superposed upon the schedule display area component from the inter-component communication control unit 109, the judging process unit (3) 123 for judging a superposed software component selects a process in accordance with the type of the notified software component. The default value setting unit 127 sets default values of a member and date and a rule for determining a default value, if the member and date are not designated when the scheduling data is referred to, registered, copied, or moved. The default date may be a current date. When selected scheduling data is registered in the schedule of other users, the default date may be the date information of the selected scheduling data. The default member may be a user, a member displayed in the schedule screen 707, or the like. The default member may be an owner of the selected schedule or the like when the schedule is copied or moved.

Figure 8:
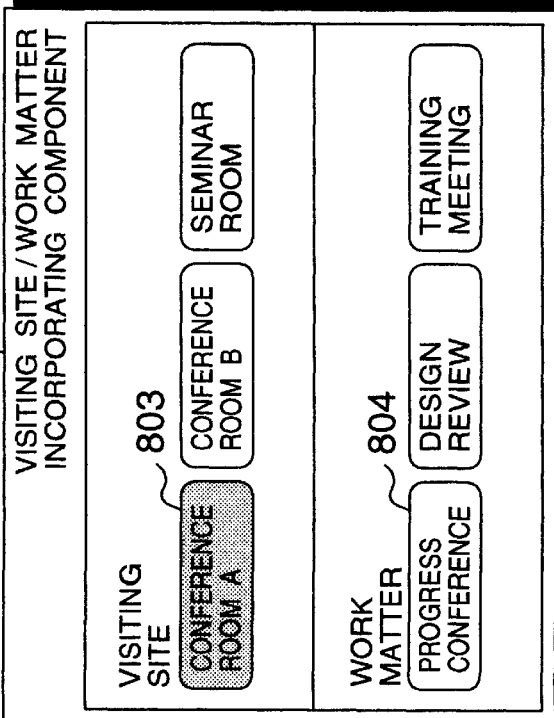
FIG. 8 shows an example of a display incorporating visiting site information.

The visiting site/work matter registering component 113 includes a visiting site/work matter storage buffer 124, a visiting site/work matter management unit 125, and a judgment process unit (4) 126 for judging a superposed software components. The visiting site/work matter storage buffer 124 temporarily stores visiting site information and work matter information. The visiting site/work matter management unit 125 acquires the visiting site information and work matter information including user ID from the visiting site/work matter storage device and stores it in the visiting site/work matter buffer 124. The visiting site/work matter management unit 125 also performs a process of displaying the software component representing the visiting site information and work matter information stored in the visiting site/work matter storage buffer 124, on the visiting site/work matter component 801 such as shown in FIG. 8. For example, if the user ID is "USER001", the visiting site information of the item numbers 1 to 3 in FIG. 5A containing the user ID "USER001" and the work matter information of the item numbers 1 to 3 in FIG. 5B containing the user ID "USER001" are acquired from the visiting site/work matter information storing device 106 storing the visiting site information shown in FIG. 5A and the work matter information shown in FIG. 5B, and the acquired information is stored in the visiting site/work matter storage buffer 124. The stored visiting site information of the item numbers 1 to 3 shown in FIG. 6A and the stored work matter information of the item numbers 1 to 3 shown in FIG. 6B are displayed on the visiting site/work matter component 801 such as shown in FIG. 8. Upon a notice of a software component superposed upon the visiting site/work matter components from the inter-component communication control unit 109, the judging process unit (4) 126 for judging a superposed software component selects a process in accordance with the type of the notified software component.

Next, the operation of the scheduling management system of the embodiment will be described in detail with reference to FIGS. 9 to 21.

Figure 9:
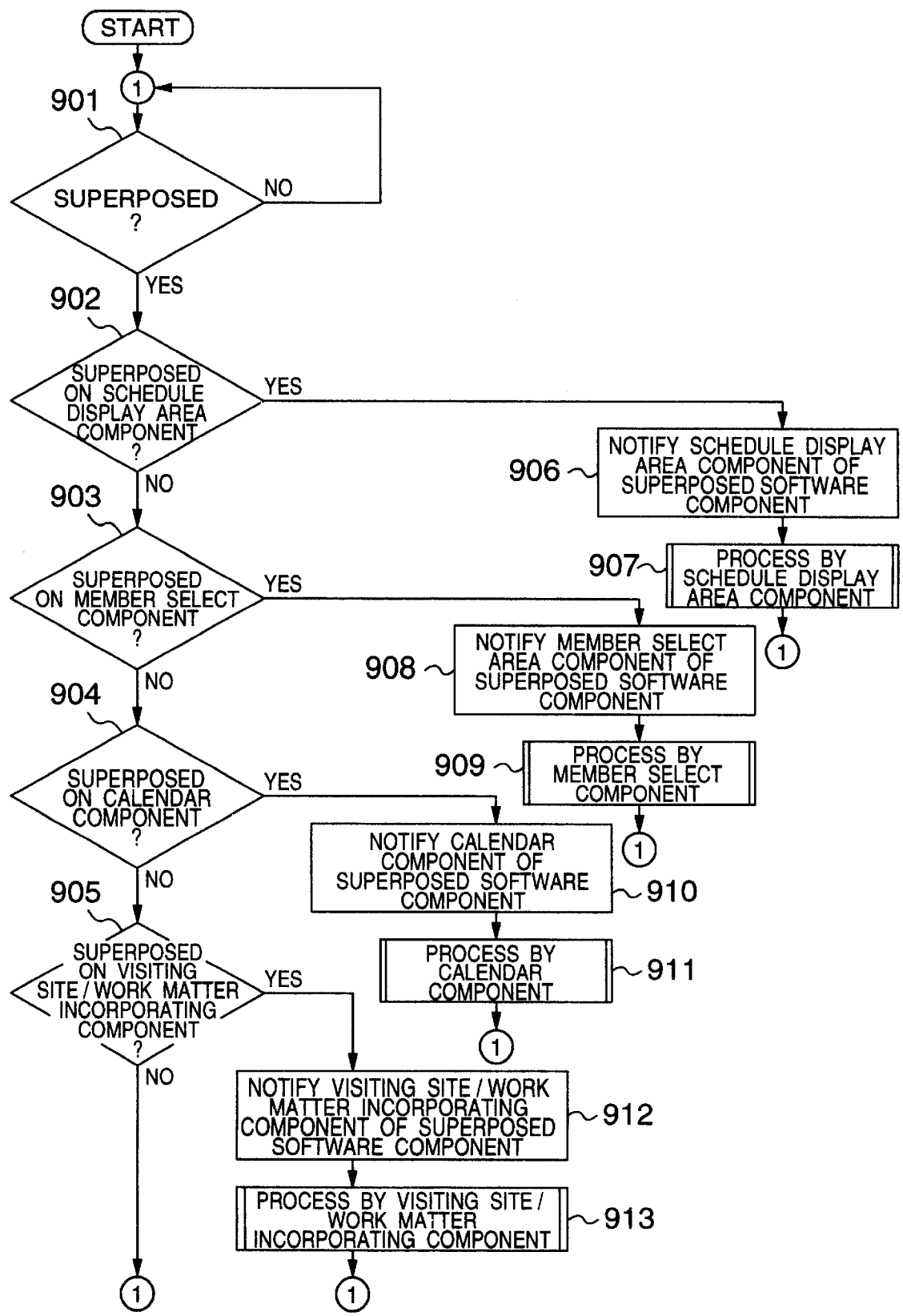
FIG. 9 is a flow chart illustrating a process to be executed by an inter-component communication control unit.

First, with reference to FIG. 9, a process to be executed by the inter-component communication control unit 109 will be described. If a software component is superposed on any one of components constituting the GUI screen by using the input device 101 such as a pointing device, it is judged at a branch 901 as YES. Next, it is judged at branches 902 to 905 on which component constituting the GUI screen the software component was superposed.

If the software component is superposed on the schedule display area component 703 on the GUI screen shown in FIG. 7, it is judged at the branch 902 as YES, and at a process block 906 the inter-component communication control unit 109 notifies the schedule display area component 112 of the superposed software component. After this notice, the schedule display area component 112 performs a necessary process at a process block 907.

If the software component is superposed on the member select component 701, it is judged at the branch 903 as YES, and at a process block 908 the inter-component communication control unit 109 notifies the member select component 110 of the superposed software component. After this notice, the member select component 110 performs a necessary process at a process block 909.

If the software component is superposed on the calendar component 702, it is judged at the branch 904 as YES, and at a process block 910 the inter-component communication control unit 109 notifies the calendar component 111 of the superposed software component. After this notice, the calendar component 111 performs a necessary process at a process block 911.

If the software component is superposed on the visiting site/work matter incorporating component 801, it is judged at the branch 905 as YES, and at a process block 912 the inter-component communication control unit 109 notifies the visiting site/work matter incorporating component 113 of the superposed software component. After this notice, the visiting site/work matter incorporating component 113 performs a necessary process at a process block 913.

Next, a process to be executed by each component constituting the GUI screen after the inter-component communication control unit 109 notifies the superposed software component, will be described.

Figure 10:
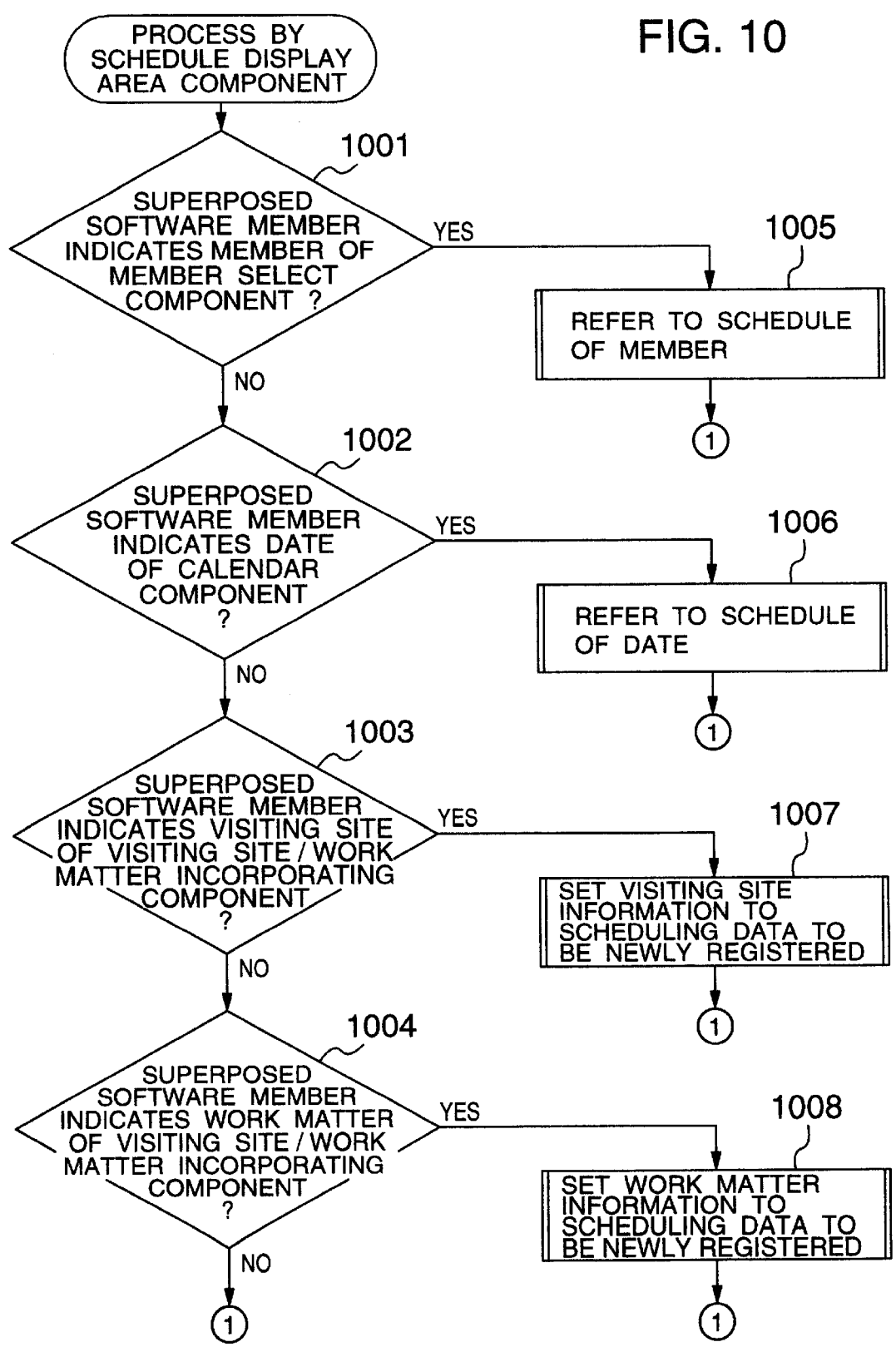
FIG. 10 is a flow chart illustrating a process to be executed by a schedule display area component.

First, a process 907 to be executed by the schedule display area component 112 after receiving the notice will be described with reference to FIG. 10. After the notice is received, at branches 1001 to 1004 a process is selected in accordance with the type of the superposed software component. If the superposed software component is the software component 704 or 705 indicating a member in the member select component 701, the branch 1001 judges as YES. At a process block 1005 a process is performed for referring to the schedule of the member indicated by the software component at the default date. The default date is preset in the default value setting unit 127. If the superposed software component is the software component 706 indicating a date in the calendar component 702, the branch 1002 judges as YES. At a process block 1006 a process is performed for referring to the schedule of the date indicated by the software component at the default member. The default member is preset in the default value setting unit 127. If the superposed software component is the software component 803 indicating visiting site information in the visiting site/work matter incorporating component 801, the branch 1003 judges as YES. At a process block 1007 a process is performed for setting the visiting site information indicated by the software component as the visiting site of a schedule to be newly registered. If the superposed software component is the software component 804 indicating work matter information in the visiting site/work matter incorporating component 801, the branch 1004 judges as YES. At a process block 1008 a process is performed for setting the work matter information indicated by the software component as the work matter site of a schedule to be newly registered. If the superposed software component is different from the above-described components, the flow returns to (1) in FIG. 9 without performing any process.

Figure 11:
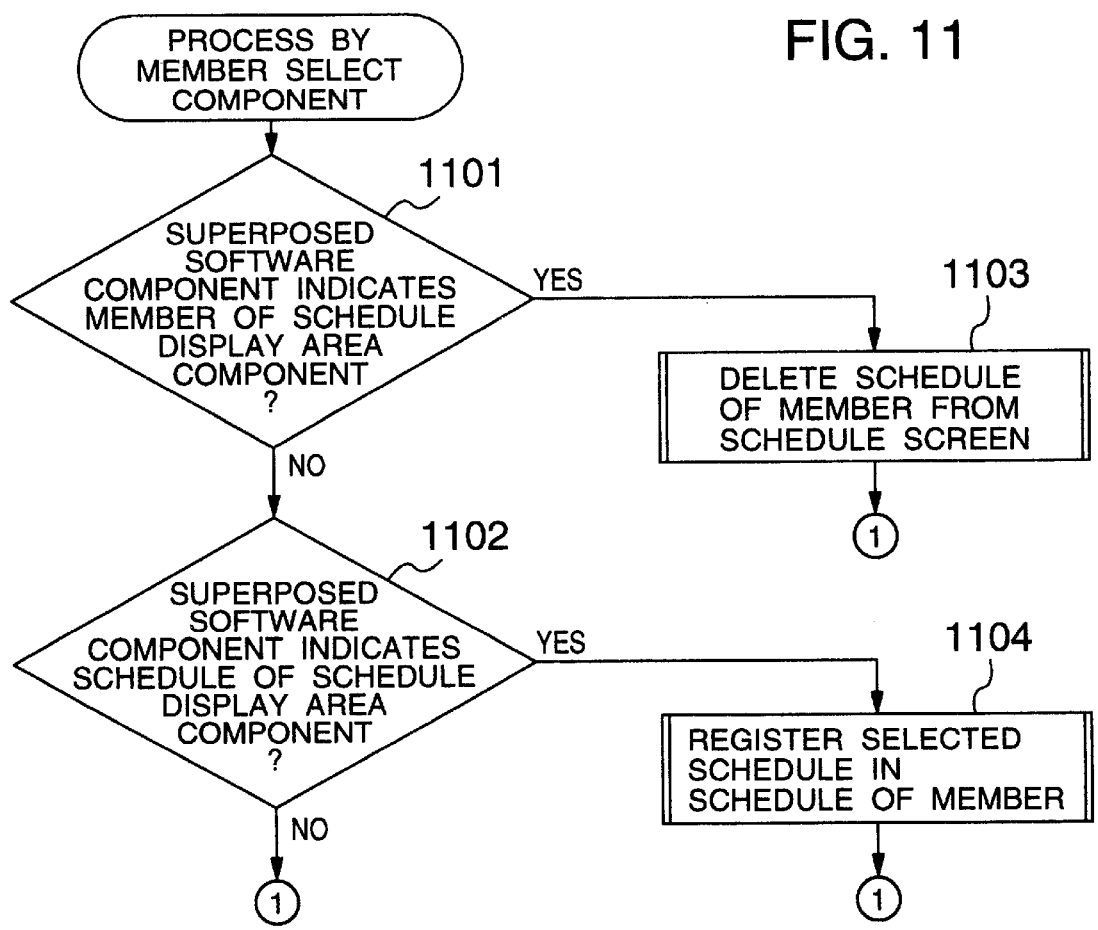
FIG. 11 is a flow chart illustrating a process to be executed by a member select component.

A process 909 to be executed by the member select component 110 after receiving the notice will be described with reference to FIG. 11. After the notice is received, at branches 1101 to 1102 a process is selected in accordance with the type of the superposed software component. If the superposed software component is the software component 708 or 709 indicating a member in the schedule display area component 703, the branch 1101 judges as YES. At a process block 1103 a process is performed for deleting the schedule of the member indicated by the software component from the schedule screen 707. If the superposed software component is the software component 710 or 711 indicating scheduling data in the schedule display area component 703, the branch 1102 judges as YES. At a process block 1104 a process is performed for registering scheduling data having similar contents as those of the schedule indicated by the software component, in the schedule of the member selected on the member select component 701 at the default date. The default date is preset in the default value setting unit 127. If the superposed software component is different from the above-described components, the flow returns to (1) in FIG. 9 without performing any process.

Figure 12:
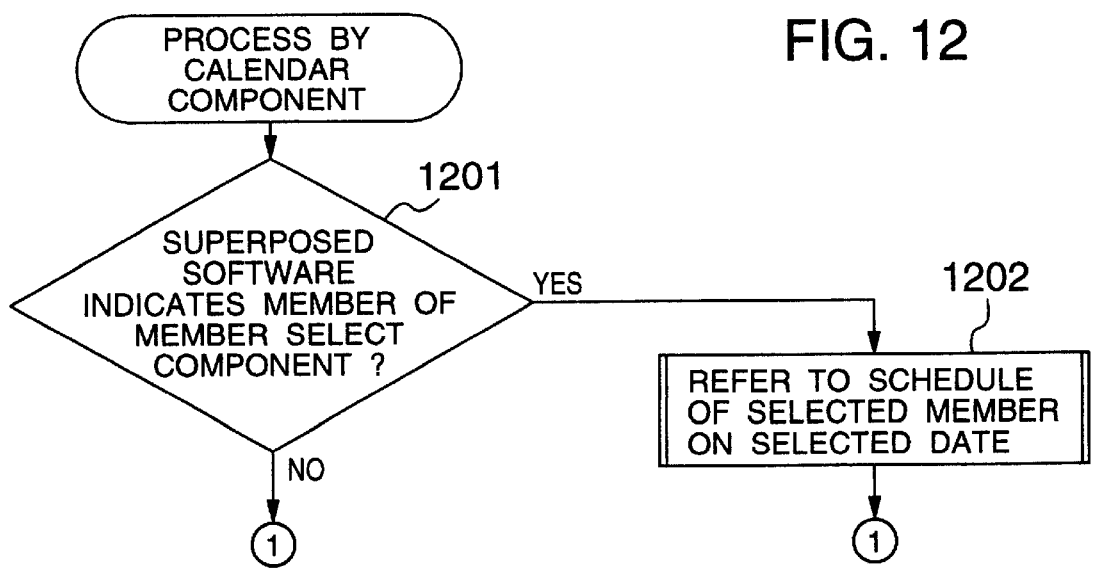
FIG. 12 is a flow chart illustrating a process to be executed by a calendar component.

A process 911 to be executed by the calendar component 111 after receiving the notice will be described with reference to FIG. 12. After the notice is received, at a branch 1201 a process is selected in accordance with the type of the superposed software component. If the superposed software component is the software component 704 or 705 indicating a member in the member select component 701, the branch 1201 judges as YES. At a process block 1202 a process is performed for referring to the schedule of the selected member at the selected date. If the superposed software component is different from the above-described components, the flow returns to (1) in FIG. 9 without performing any process.

Figure 13:
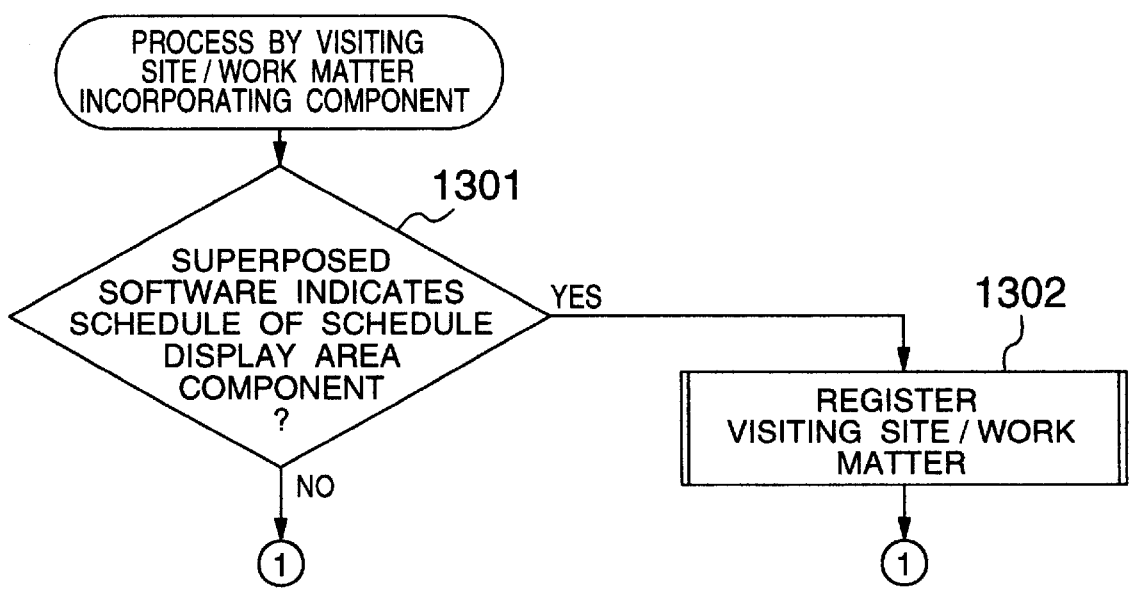
FIG. 13 is a flow chart illustrating a process to be executed by a visiting site/work matter incorporating component.

A process 913 to be executed by the visiting site/work matter incorporating component 113 after receiving the notice will be described with reference to FIG. 13. After the notice is received, at a branch 1301 a process is selected in accordance with the type of the superposed software component. If the superposed software component is the software component 710 or 711 indicating a schedule in the schedule display area component 703, the branch 1301 judges as YES. At a process block 1302 a process is performed for registering visiting site information and work matter information of the scheduling data indicated by the software component, in the visiting site/work matter incorporating component 113. If the superposed software component is different from the above-described components, the flow returns to (1) in FIG. 9 without performing any process.

Next, each process selected by each component constituting the GUI screen will be described in detail.

Figure 14:
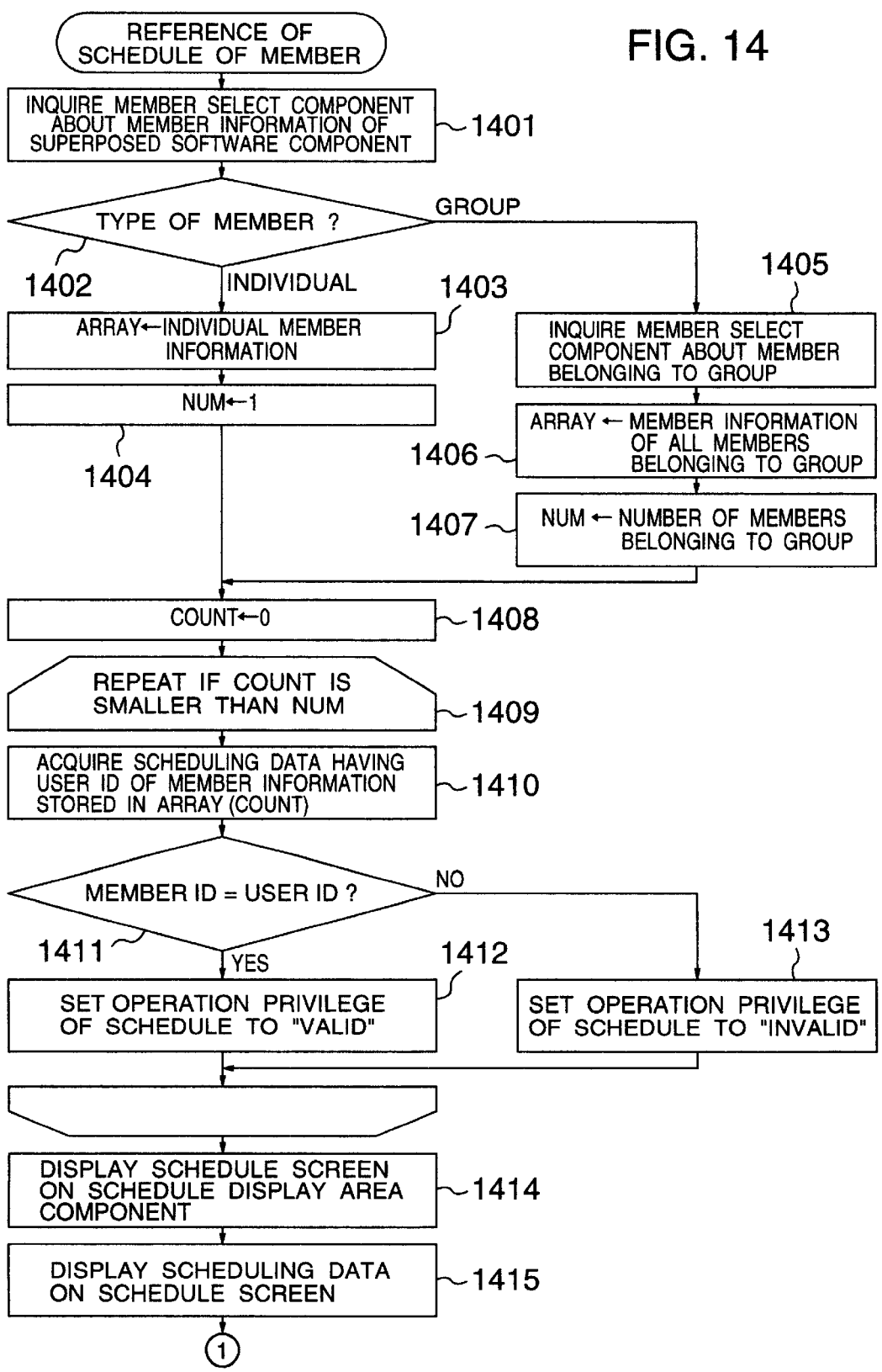
FIG. 14 is a flow chart illustrating a member schedule reference process.

First, a member schedule reference process 1005 will be described with reference to FIG. 14. Upon being notified from the inter-component communication control unit 109 that the software component 704 or 705 indicating a member in the member select component 701 was superposed upon the schedule display area component 703, at a process block 1401 the schedule display area component 112 inquires the member select component 110 about member information of the member indicated by the software component. FIG. 7 shows an example that the software component indicating "group 1" was superposed upon the schedule display area component 703. In this example, in response to the inquiry, the information of the item 4 shown in FIG. 2 is returned to the schedule display area component 112. Next, at a branch 1402 it is judged, from the item of the type 203 of the inquired member information, whether the member is an individual or a group. In the example shown in FIG. 7, the type 203 of the item 4 is referred to so that it is judged that the member is a group.

If the member is an individual, at a process block 1403 the member information of the individual is stored in an array which stores member information of the member whose schedule is referred to. At a process block 1404 a variable NUM indicating the number of members whose schedules are referred to is set with "1".

If the member is a group, at a process block 1405 the member select component 110 is inquired about member information of all members belonging to the group. In the example shown in FIG. 7, in response to the inquiry, information of the items 5 and 6 having the parent ID 204 of "GROUP001" which is the user ID 201 of the "group 1" is returned to the schedule display area component 112.

Next, at a process block 1408 a variable COUNT for counting the number of members acquired the scheduling data is set to "0". At a repetition process 1409, the following processes are repeated by the number of members to be displayed. In the example of FIG. 7, the following processes are repeated twice.

At a process block 1410 the scheduling data containing the user ID of the member whose schedule is referred to and the default date is acquired from the scheduling data storage device 105. Next, at a branch 1411 it is judged, through comparison between the user ID 201 of the member and the user ID stored in the ID storage buffer 122, whether the member whose schedule is referred to is the user or not. If the member whose schedule is referred to is the user, at the branch 1411 it is judged as YES. At a process block 1412, the operation privileges 401 of all the acquired user schedules are made valid, and the acquired scheduling data is stored in the scheduling data storage buffer 120. If the member is not the user, it is judged at the branch 1411 as NO. At a process block 1413 the operation privileges 401 of all the acquired member schedules are made invalid, and the acquired scheduling data is stored in the scheduling data storage buffer 120.

In the example shown in FIG. 7, the above processes are executed first for the item 5. Assuming that the default date is a current date (Oct. 28, 1997), at the process block 1410 the scheduling data containing the user ID 301 of "USER001" and the date 302 of "Oct. 28, 1997", i.e., the information of the item 2 shown in FIG. 3, is acquired from the scheduling data storage device 105. Next, at the branch 1411 it is judged whether the member is the user. In this case, if "USER001" is stored in the ID storage buffer 122, the member in the item 5 is judged as the user. Therefore, at the next process block 1412, the "valid" operation privileges 401 are added to all the acquired schedules of the member of the item 5 shown in FIG. 2, i.e., to the information in the item 2 shown in FIG. 3, and the information in the item 1 shown in FIG. 4 is stored in the scheduling data storage buffer 120.

The member in the item 6 in FIG. 2 has the user ID "USER002" which is different from the ID "USER001" stored in the ID storage buffer 122. Therefore, it is judged at the branch 1411 that the member is not the user. At the process block 1413 the "invalid" operation privileges 401 are therefore added to all the acquired schedules of the member of the item 6 shown in FIG. 2, i.e., to the information in the item 4 shown in FIG. 3, and the information in the item 2 shown in FIG. 4 is stored in the scheduling data storage buffer 120.

At a process block 1414, the schedule screen 707 for displaying scheduling data is displayed on a schedule display area. Lastly, at a process block 1415 the scheduling data stored in the scheduling data storage buffer 120 is displayed on the schedule screen. In the example shown in FIG. 7, at the process block 1415 the scheduling data of the items 1 and 2 shown in FIG. 4 and stored in the scheduling data storage buffer 120 is displayed on the schedule screen 707.

In the above description, after the schedule screen 707 is displayed, the scheduling data is displayed. However, the scheduling data may be displayed in different ways. Namely, if the schedule display area component 112 has a function of judging a component superposed area and when the software component indicating a member is superposed upon the area where the schedule screen 707 is displayed, the schedules of the new member may be additionally displayed on the schedule screen 707. Alternatively, if the software component indicating a member is superposed upon the area where the schedule screen 707 is not displayed on the schedule display area component 703, a new schedule screen 707 may be opened and the schedule of the member may be displayed thereon.

Figure 15:
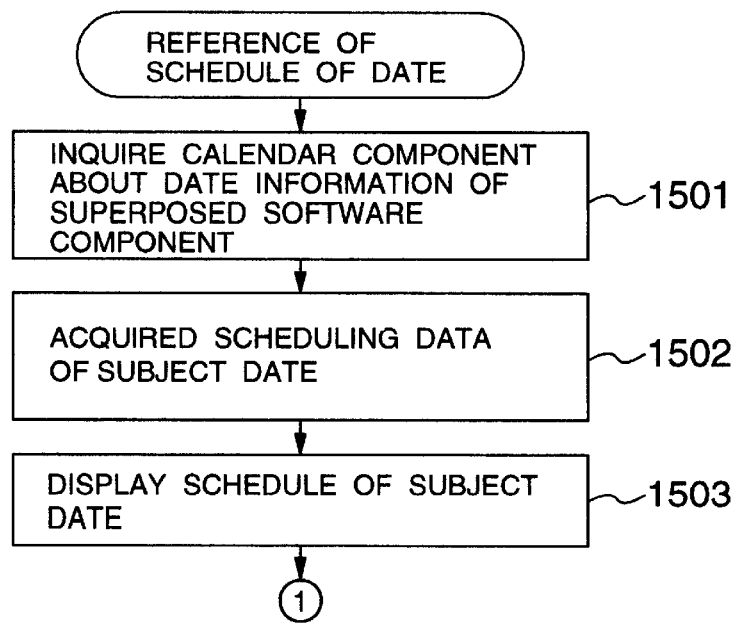
FIG. 15 is a flow chart illustrating a date schedule reference process.

A date schedule reference process 1006 will be described with reference to FIG. 15. Upon being notified from the inter-component communication control unit 109 that the software component 706 indicating a date in the calendar component 702 was superposed upon the schedule display area component 703, at a process block 1501 the schedule display area component 703 is inquired about the date information indicated by the software component. For example, if the software component indicating the date Oct. 28, 1997 is superposed upon the schedule display area component, the date information Oct. 28, 1997 is returned to the schedule display area component 112 in response to the inquiry.

At a process block 1502 the scheduling data containing a default user ID of the member and the inquired date is acquired from the scheduling data storage device 105 and the operation privilege 401 is set in a manner similar to the schedule reference process, and the acquired scheduling data is stored in the scheduling data buffer 120. Consider, for example, the case wherein the default member is the user and the user ID is "USER001". In this case, the scheduling data in the item 2 shown in FIG. 3 and having the user ID 301 of "USER001" and the date 302 of "Oct. 28, 1997" is acquired. Since the schedule is the user's schedule, the operation privilege 401 is set to "valid", and the scheduling data in the item 1 shown in FIG. 4 is stored in the scheduling data buffer 120.

Lastly, at a process block 1502 the acquired scheduling data is displayed on the schedule screen 707. In the above example, the scheduling data in the item 1 shown in FIG. 4 and stored in the scheduling data buffer 120 is displayed on the schedule screen 707.

Figure 16:
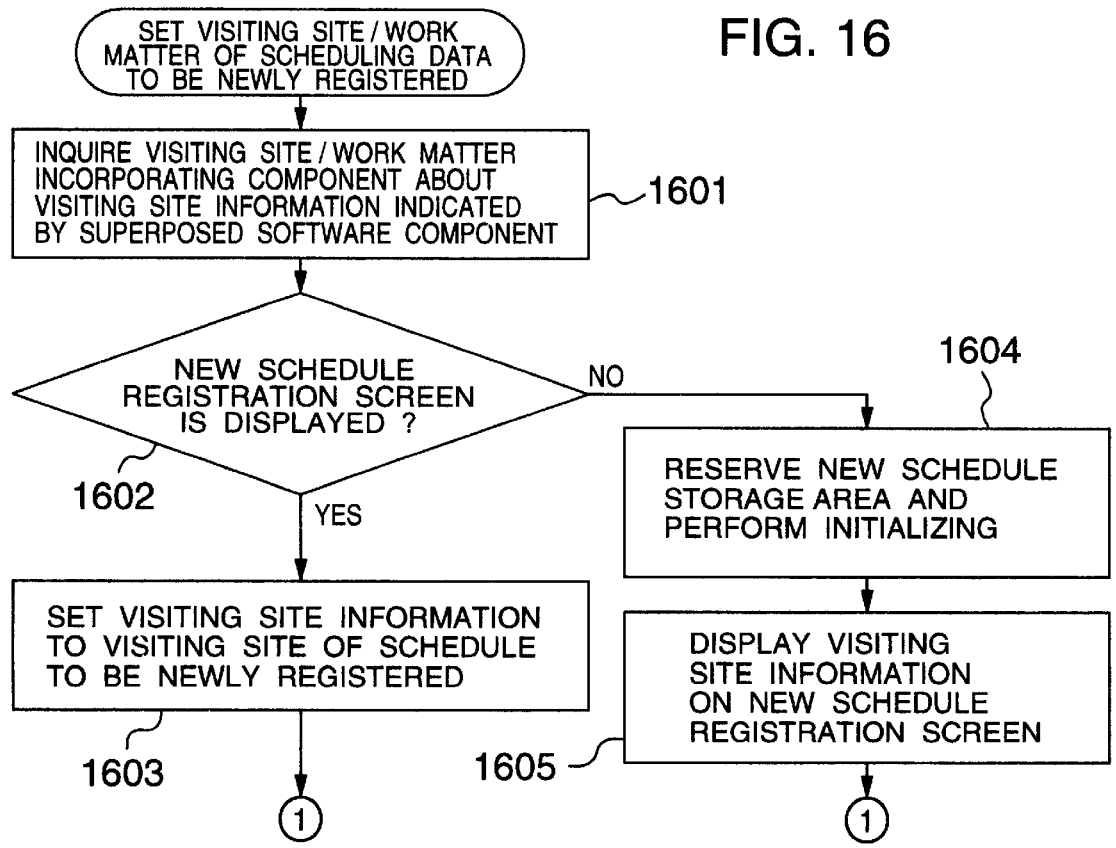
FIG. 16 is a flow chart illustrating a process of incorporating visiting site information when new scheduling data is registered.

A process 1007 of setting visiting site information to scheduling data to be newly registered will be described with reference to FIG. 16. Upon being notified from the inter-component communication control unit 109 that the software component 803 indicating visiting site information in the visiting site/work matter incorporating component 801 was superposed upon the schedule display area component 802, at a process block 1601 the visiting site/work matter incorporating component 113 is inquired about the visiting site information indicated by the software component. For example, if the software component 803 indicating "conference room A" in the visiting site/work matter incorporating component 113 is superposed upon the schedule display area component 802, the information in the item 1 shown in FIG. 6A is returned to the schedule display area component 112 in response to the inquiry.

Next, at a branch 1602 it is judged whether a new schedule registration screen 805 is displayed on the schedule display area component 802. If displayed, at a process block 1603 the visiting site information indicated by the superposed software component is set to a visiting site 402 in the scheduling data to be newly registered. The visiting site information is displayed in a visiting site column 806 of the new schedule registration screen 805.

If the new schedule registration screen 805 is not displayed, at a process block 1604 an area for new schedule registration is reserved in the scheduling data storage buffer 120 and an initialization process is performed. At a process block 1605 the visiting site information indicated by the superposed software component is set to the visiting site 402 of the scheduling data to be newly registered. The new schedule registration screen 805 with the visiting site 806 being set is displayed.

In the above example, at the process block 1603 if the new schedule registration screen 805 is displayed, or at the process block 1605 if not displayed, the "conference room A" is set to the visiting site 402 in the new scheduling data and displayed in the visiting site column 806 in the new schedule registration screen 805 as shown in FIG. 8.

Figure 17:
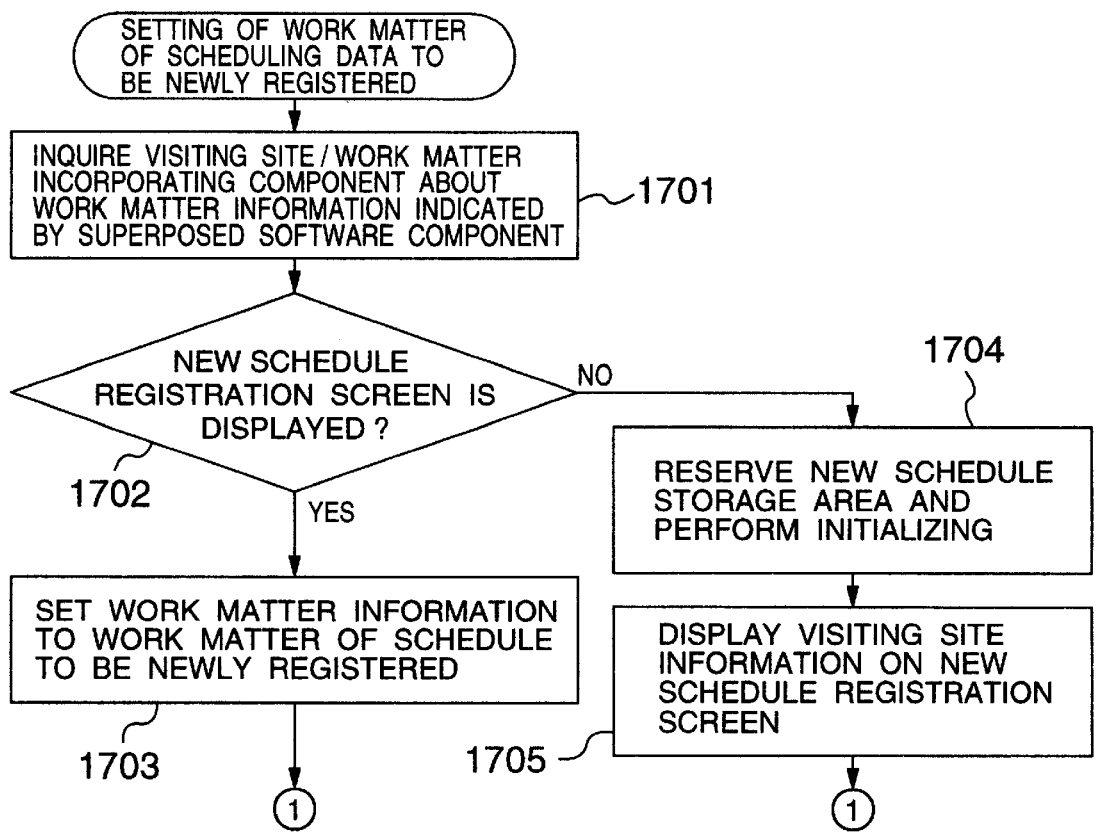
FIG. 17 is a flow chart illustrating a process of incorporating work matter information when new scheduling data is registered.

A process 1008 of setting work matter information to scheduling data to be newly registered will be described with reference to FIG. 17. Upon being notified from the inter-component communication control unit 109 that the software component 804 indicating work matter information in the visiting site/work matter incorporating component 801 was superposed upon the schedule display area component 802, at a process block 1701 the visiting site/work matter incorporating component 113 is inquired about the work matter information indicated by the software component. For example, if the software component 804 indicating "progress conference" in the visiting site/work matter incorporating component 801 is superposed upon the schedule display area component 802, the information in the item 1 shown in FIG. 6B is returned to the schedule display area component 112 in response to the inquiry.

Next, at a branch 1702 it is judged whether the new schedule registration screen 805 is displayed on the schedule display area component 802. If displayed, at a process block 1703 the work matter information indicated by the superposed software component is set to a work matter 403 in the scheduling data to be newly registered. The work matter information is displayed in a work matter column 807 of the new schedule registration screen 805.

If the new schedule registration screen 805 is not displayed, at a process block 1704 an area for new schedule registration is reserved in the scheduling data storage buffer 120 and an initialization process is performed. At a process block 1705 the work matter information indicated by the superposed software component is set to the work matter 403 of the scheduling data to be newly registered. The new schedule registration screen 805 with the work matter 807 being set is displayed.

In the above example, at the process block 1703 if the new schedule registration screen 805 is displayed, or at the process block 1705 if not displayed, the "progress conference" is set to the work matter 403 in the new scheduling data and displayed in the work matter column 807 in the new schedule registration screen 805.

Figure 18:
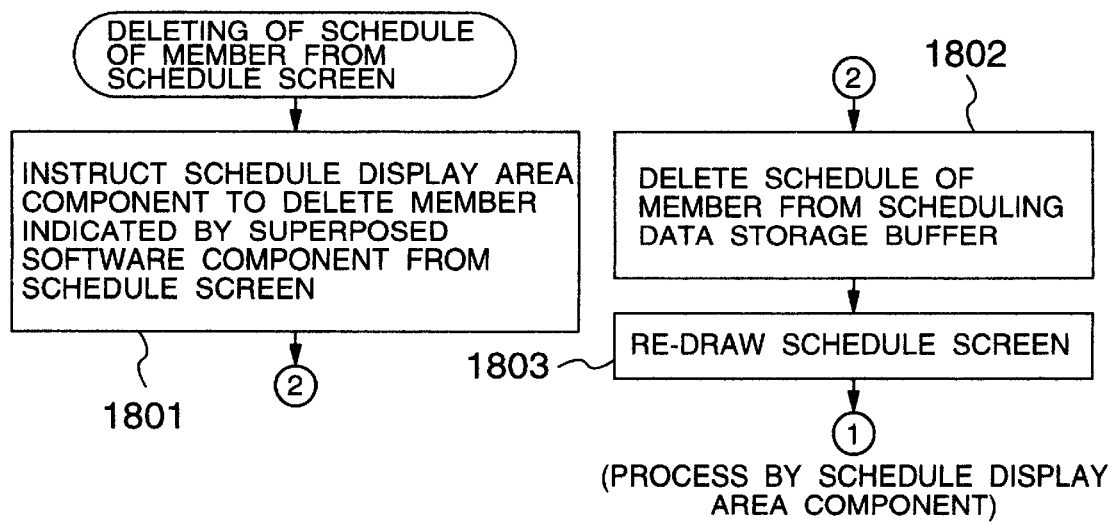
FIG. 18 is a flow chart illustrating a process of deleting a member schedule selected from a scheduling screen.

A process 1103 of deleting a schedule of a member from the schedule screen 707 will be described with reference to FIG. 18. Upon being notified from the inter-component communication control unit 109 that the software component 708 or 709 indicating a member in the schedule display area component 703 was superposed upon the member select component 701, at a process block 1801 the schedule area display component 112 is instructed to delete the schedule of the member indicated by the software component from the schedule screen 707.

Upon reception of the instruction, at a process block 1802 the schedule display area component 112 deletes the scheduling data containing the user ID of the member from the schedule storage buffer 120.

For example, if the software component 709 indicating Mr. B on the schedule screen 707 shown in FIG. 7 is superposed upon the member select component 701, at the process block 1801 the member select component 110 instructs the schedule display area component 112 to delete the schedule of Mr. B.

Upon reception of the instruction, at the process block 1802 the schedule display area component 112 deletes the scheduling data containing the user ID 404 of "USER002" of Mr. B, i.e., the information in the item 2 shown in FIG. 4, from the schedule storage buffer 120.

Lastly, at a process block 1803 in order to reflect the change contents of the scheduling data storage butter 120 upon the schedule screen 707, the schedule screen 707 is again drawn. In the above example, at the process block 1803 only the schedule of Mr. A is displayed on the schedule screen.

Figure 19:
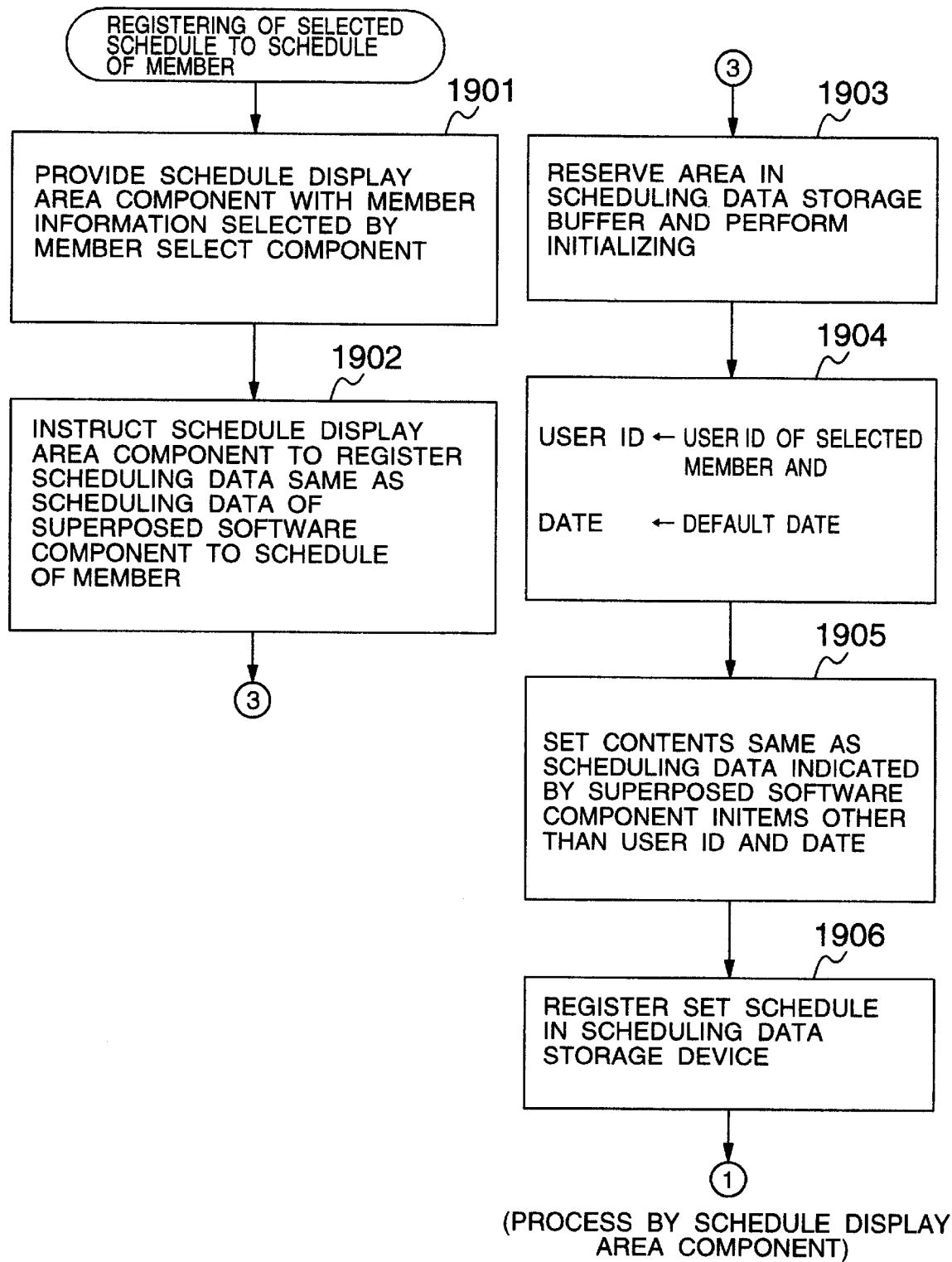
FIG. 19 is a flow chart illustrating a process of referring to the schedule of selected member on selected date.

A process 1104 of registering a selected schedule in the scheduling data of a member will be described with reference to FIG. 19. Upon being notified from the inter-component communication control unit 109 that the software component 710 or 711 indicating a schedule in the schedule display area component 703 was superposed upon the member select component 701, at a process block 1901 the member information of the member selected on the member select screen 701 is supplied to the schedule area display component 112. At a process block 1902 the schedule display area component 112 is instructed to register the data having the same contents as those indicated by the superposed software component, in the scheduling data of the member.

Upon reception of the instruction, at a process block 1903 the schedule display area component 112 reserves an area for member schedule registration in the scheduling data storage buffer 120, and an initializing process is performed. At a process block 1904 the user ID selected by the member select component 701 is set to the user ID 404 of the scheduling data. A default date is set to the date 405 of the scheduling data. The default date is preset in the default value setting unit 127. At a process block 1905 the same contents as those of the scheduling data of the superposed software component are set, excepting the items of the user ID 404 and date 405 in the scheduling data. Lastly, at a process block 1906 the registered scheduling data of the member is added to the scheduling data storage device 105.

For example, if the software component 711 indicating the schedule of Mr. B on Oct. 28, 1997 on the schedule screen 707 shown in FIG. 7 is superposed upon the member select component 701 under the condition that Mr. A is selected, at the process block 1901 the member information of Mr. A in the item 5 shown in FIG. 2 is supplied from the member select component 110 to the schedule display area component 112. At the next process block 1902 it is instructed to register the scheduling data of Mr. B on Oct. 28, 1997 in the item 2 shown in FIG. 4, in the scheduling data of Mr. A.

Upon reception of the instruction, at the process block 1904 the user ID "USER001" of Mr. A is set to the user ID 404 of the scheduling data to be newly registered. If the default date is set as the date information in the selected scheduling data, Oct. 28, 1997 is set to the date. At the process block 1905, the scheduling data indicated by the superposed software component 711, i.e., the same contents as those in the item 2 shown in FIG. 4, are set excepting the other items. The scheduling data registered in the scheduling data of Mr. A is added in the scheduling data storage device 105 at the process block 1906.

Figure 20:
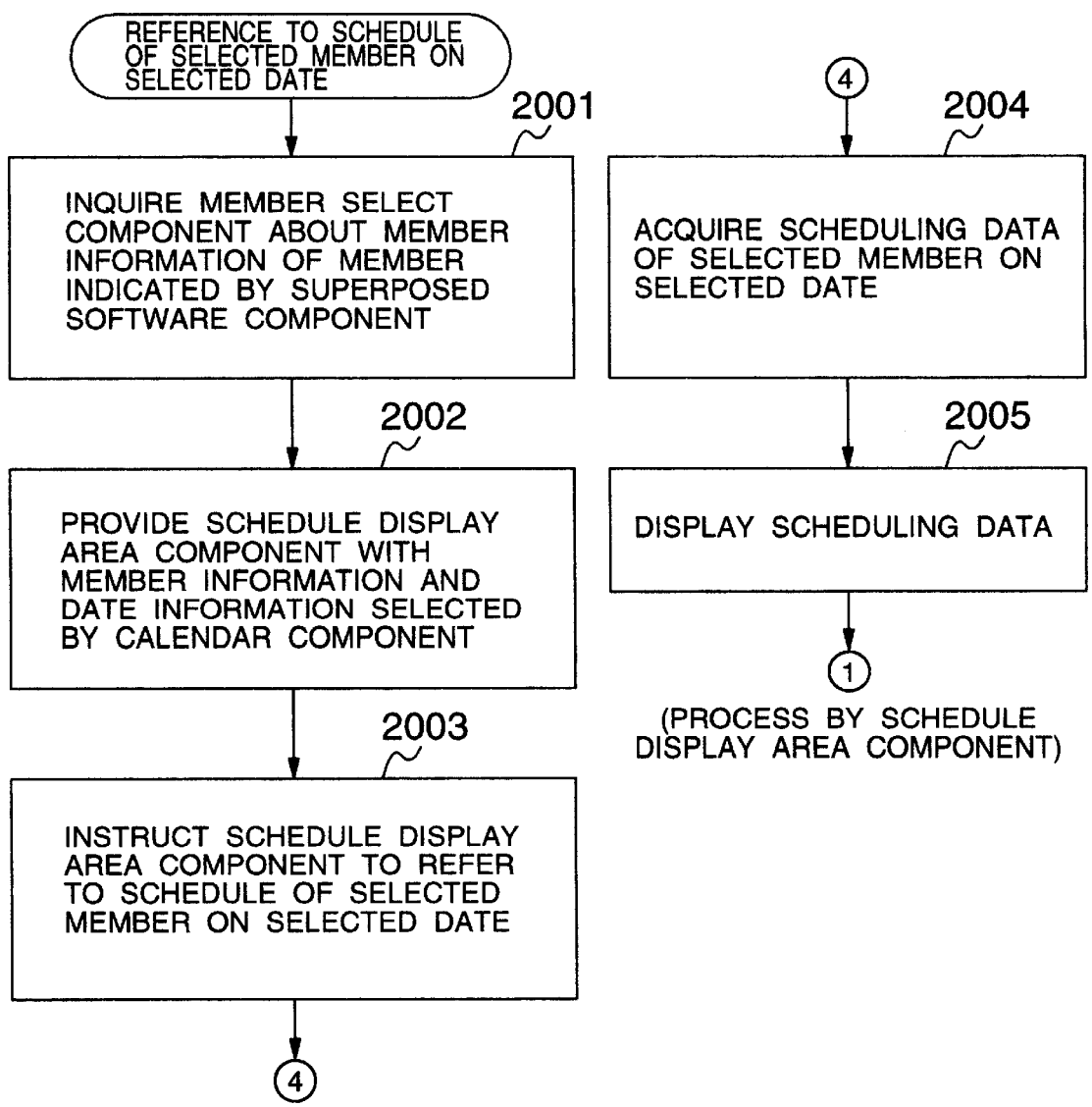
FIG. 20 is a flow chart illustrating a process of copying schedules to a selected date.

A process 1202 of referring to the scheduling data of a selected member on a selected date will be described with reference to FIG. 20. Upon being notified from the inter-component communication control unit 109 that the software component 704 or 705 indicating a member in the member select component 701 was superposed upon the calendar select component 702, at a process block 2001 the member select component 110 is inquired about the member information of the member indicated by the superposed software component. Next, at a process block 202, the member information and the date 706 information selected on the calendar component 702 are supplied to the schedule display area component 112. At the next process block 2003 the schedule display area component 112 is instructed to refer to the scheduling data of the selected member on the selected date in accordance with the supplied information.

Upon reception of the instruction, at a process block 2004 the schedule display area component 112 acquires from the scheduling data storage device 105 the scheduling data containing the user ID 301 of the selected member and the selected date 302. Similar to the member schedule reference process 1005, the operation privilege 401 is added to the acquired scheduling data to be thereafter stored in the scheduling data storage buffer 120. Lastly, at a process block 2005 the scheduling data stored in the scheduling data storage buffer 120 is displayed.

For example, if the software component indicating Mr. A is superposed upon the calendar component 702 selected with the date Oct. 28, 1997, at the process block 2001 the member select component 110 is inquired about the member information of Mr. Mr. A to obtain the member information such as shown in the item 5 shown in FIG. 2. Next, at the process block 2002 the member information of Mr. A in the item 5 shown in FIG. 2 and the date information of Oct. 28, 1997 selected by the calendar component 702 are supplied to the schedule display area component. At the process block 2003, the schedule display area component 112 is instructed to refer to the scheduling data of Mr. A on Oct. 28, 1997.

Upon reception of the instruction, at the process block 2004 the scheduling display area component 112 acquires from the scheduling data storage device 105 the scheduling data in the item 2 shown in FIG. 3 and containing the user ID 301 of Mr. A and the date 302 of Oct. 28, 1997. The operation privilege 401 is set to the acquired scheduling data in a manner described previously to be thereafter stored in the scheduling data storage buffer 120. Lastly, at the process block 2005 the scheduling data in the item 1 shown in FIG. 4 and stored in the scheduling data storage buffer 120 is displayed.

Figure 21:
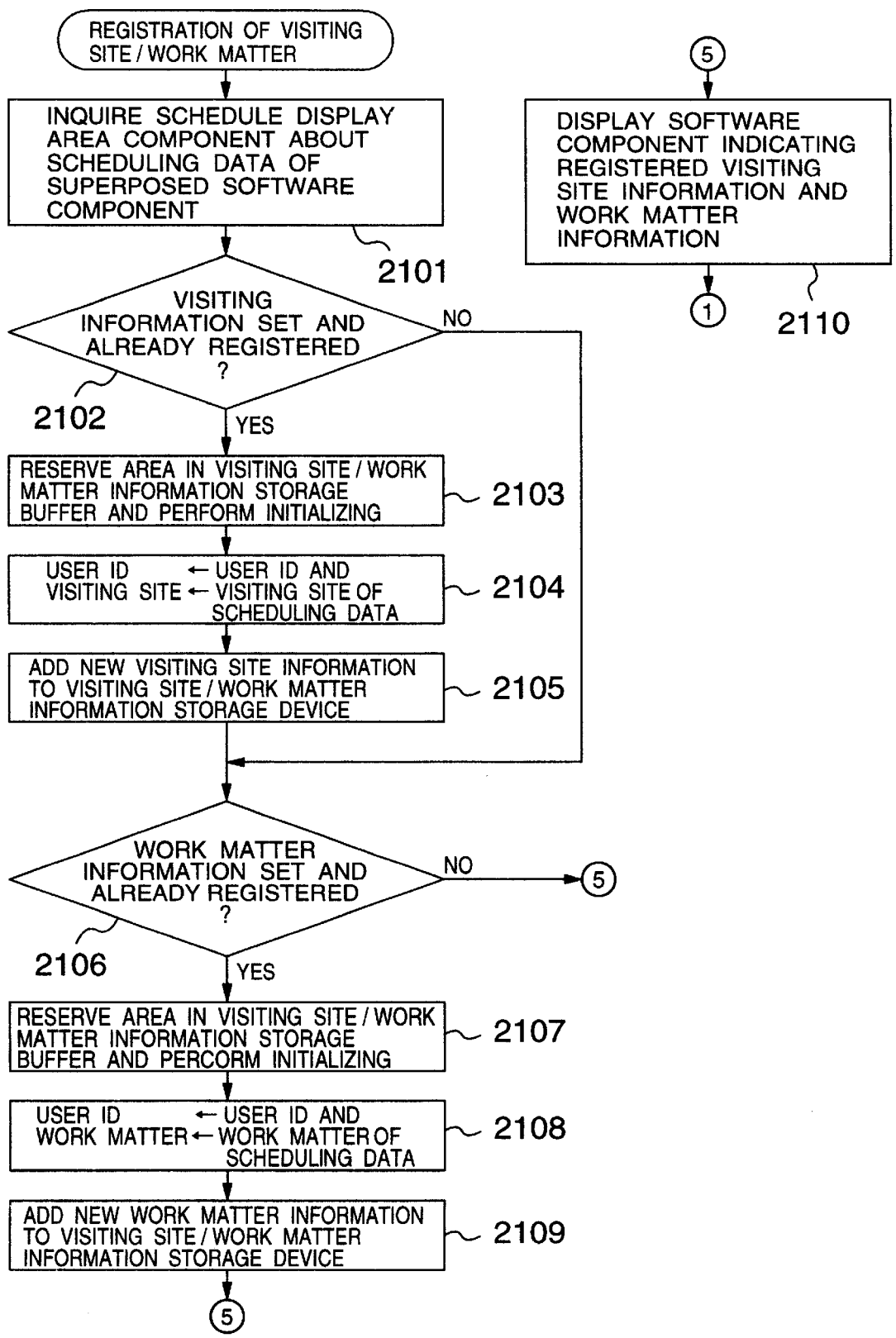
FIG. 21 is a flow chart illustrating a visiting site/work matter.

A visiting site/work matter registration process 1302 will be described with reference to FIG. 21. Upon being notified from the inter-component communication control unit 109 that the software component 710 or 711 indicating a schedule in the schedule display area component 703 was superposed upon the visiting site/work matter incorporating component 801, at a process block 2101 the schedule display area component 112 is inquired about the scheduling data indicated by the superposed software component. In accordance with the inquired scheduling data, visiting site information is first registered and then work matter information is registered. The order of registering the visiting site information and work matter information may be reversed.

At a branch 2102 it is judged whether the visiting site of the scheduling data is set and already stored. Only if the both conditions are met, the visiting site information is registered by the following procedure. At a process block 2103 an area for registering the visiting site information is reserved in the visiting site/work matter storage buffer 124. At a process block 2104, the visiting site information and user ID in the scheduling data indicated by the superposed software component are stored respectively in a visiting site 602 and a user ID 601. At a process block 2105, the registered contents are added to the visiting site/work matter information storage device 106.

Next at a branch 2106 it is judged whether the work matter of the scheduling data is set and already registered.

Only if the both conditions are met, the visiting site information is registered by the following procedure. At a process block 2107 an area for registering the visiting site information is reserved in the visiting site/work matter storage buffer 124. At a process block 2108, the visiting site information and user ID in the scheduling data indicated by the superposed software component are stored respectively in a visiting site 604 and a user ID 603. At a process block 2109, the registered contents are added to the visiting site/work matter information storage device 106. Lastly, at a process block 2110 the software component indicating the registered visiting site information and work matter information is displayed on the visiting site/work matter incorporating component 801.

For example, if the software component 710 indicating the scheduling data of Mr. A on Oct. 28, 1997 displayed in the scheduling screen 707 shown in FIG. 7 is superposed upon the visiting site/work matter incorporating component 801, at the process block 2101 the scheduling data in the item 1 shown in FIG. 4 is supplied to the visiting site/work matter incorporating component 113. If it is assumed that the visiting site information of Mr. A shown in FIG. 6A is already registered, then the visiting site 402 of the scheduling data in the item 1 shown in FIG. 4 is "conference room A" and this information exists in the visiting site 602 in the item 1 shown in FIG. 6A. Therefore, it is judged as NO at the branch 2102. In this example, therefore, the visiting site information is not registered.

For the work matter registration, if it is assumed that the work matter information of Mr. A shown in FIG. 6B is already registered, then the work matter 403 of the scheduling data in the item 1 shown in FIG. 4 is "review" and this information is not stored in the visiting site/work matter information storage buffer 124. Therefore, it is judged as YES at the branch 2106. At the next process block 2108 "review" and "USER001"are respectively set to the work matter 604 and user ID 603. At the process block 2109, the work matter information is added to the visiting site/work matter information storage device 106. Lastly, the software component indicating the work matter "review" of Mr. A is displayed on the visiting site/work matter incorporating component 801.

The invention is not limited to the above-described embodiment. For example, if the software component indicating the date on the calendar component 702 is superposed upon the member select component 701, the member schedule reference process may be selected for the member selected by the member select component 701 on the date indicated by the software component. This can be achieved by the following procedure. The member select component 110 inquires the calendar component 111 about the date information indicated by the superposed software component. Next, the inquired date information and the member information of the member selected by the member select component 701 are supplied to the schedule display area component 112. The schedule display area component 112 is instructed to perform a process of referring to the scheduling data of the selected member on the selected date in accordance with the supplied information. The instructed schedule display area component 112 performs a process of referring to the scheduling data of the designated member on the designated date.

In the schedule reference process of the above embodiment, although a single software component is superposed, a plurality of software components may be superposed. In this case, the number of superposed software components is not limited. This can be achieved by repeating the processes from the branch 1402 to the repetition block 1409 shown in FIG. 14 by the number of times same as the number of superposed software components.

In the above embodiment, although the ID storage buffer 122 and default value setting unit 127 are contained in the schedule display area component 112, it is not necessary to contain them in the schedule display area component 112, but they may be disposed in any area of the system.

Also, the scheduling data management unit 121 performs a process of data transfer to and from the scheduling data storage device 105. This data transfer unit may be disposed in any area of the system. The same configuration is also applied to the member information management unit 115, calendar information management unit 118, and visiting site/work matter management unit 125.

The layout of the components constituting the GUI screen is not limited only to that shown in FIG. 7, but any layout may be applied.

In the above embodiment, a process is selected in accordance with a relation of a software component with components constituting the GUI screen, the relation being determined from the superposition of software components. However, other operations may be applied so long as the relation of a software component with components constituting the GUI screen can be determined.

In the member schedule reference process, the operation privilege 402 of scheduling data of a member other than the user is set "invalid". However, a table storing a relation, for example, a superior officer and a secretary may be prepared and the operation privilege 401 of scheduling data of the superior officer may be set "valid" relative to the secretary. Alternatively, scheduling data may be provided with an item for storing a member who registered the scheduling data in place of a user, and the operation privilege 401 of scheduling data may be set "valid" relative to the member who registered the scheduling data, in addition to the user.

As described so far, according to the present invention, main tasks of the scheduling management system can be performed with a simple operation of superposition of a software component upon a component constituting the GUI screen. Further, if the member whose scheduling data is to be referred to is superposed upon the schedule display area, the schedules of the member can be displayed. Therefore, any user can easily image and memorize the operations. The invention thus provide a simple and easy-to-memorize operation method so that even a novice user can learn main operations in relatively short time.

What is claimed is:

1. A scheduling management system, comprising:
   a scheduling data storage device for storing scheduling data including a date, a time, and a work matter;
   a member information storage device for storing member information including a user ID, a user name, a flag indicating whether the member is an individual or a group, and ID information of a hierarchical level the member belongs;
   a calendar information storage device for storing calendar information;
   a display device for display a GUI screen containing a plurality of components;
   an input device for designating an arbitrary position on the GUI screen and entering an operation relative to the designated position on the GUI screen; and
   an inter-component communication control unit for, if a movable software component on a certain component constituting the GUI screen is selected with said input device and is moved and superposed upon another component constituting the GUI screen, notifying the motion destination other component of the superposed software component;

wherein the components constituting the GUI screen include:

a calendar component for temporarily storing calendar information acquired from said calendar information storage device in a calendar information storage area of said calendar component, displaying a software component indicating the date in a calendar format on the GUI screen in accordance with the acquired calendar information, and selecting, if another software component is superposed upon the software component by said input device, a process in accordance with a type of the other software component;

a schedule display area component for temporarily storing scheduling data acquired from said scheduling data storage device in a scheduling data storage area of said schedule display area component, graphically displaying a software component indicating the scheduling data in a corresponding area of a schedule screen constituted of a time axis and a member axis, in accordance with the acquired scheduling data, and selecting, if another software component is superposed upon the software component by said input device, a process in accordance with a type of the other software component; and a member select component for temporarily storing member information acquired from said member information storage device in a member information storage area of said member select component, hierarchically displaying a software component indicating the member on the GUI screen in accordance with the acquired member information, and selecting, if another software component is superposed upon the software component by said input device such as a pointing device, a process in accordance with a type of the other software component;

wherein if the software component indicating the date on said calendar component is superposed upon said schedule display area component by said input device such as a pointing device, said inter-component communication control unit supplies information of the software component from said calendar component to said schedule display area component, and said schedule display are a component judges that the software component is a software component of a type that indicates the date, to thereby select a process of referring to the scheduling data of the designated date;

if the software component indicating the member on said member select component is superposed upon said schedule display area component by said input device such as a pointing device, said inter-component communication control unit supplies information of the software component from said member select component to said schedule display area component, and said schedule display area component judges that the software component is a software component of a type that indicates the member, to thereby select a process of referring to the scheduling data of the member and judge from the information of the software component whether the member is an individual or a group to perform the selected process; and if the software component indicating the member displayed on the schedule screen on said schedule display area component is superposed upon said member select component by said input device such as a pointing device, said inter-component communication control unit supplies information of the software component from said schedule display area component to said member select component, and said member select component judges that the software component is a software component of a type that indicates the member, to thereby select a process of deleting the scheduling data of the member from the scheduling screen.

2. A scheduling management system, comprising:

a scheduling data storage device for storing scheduling data including a date, a time, and a work matter;

a member information storage device for storing member information including a user ID, a user name, a flag indicating whether the member is an individual or a group, and ID information of a hierarchical level the member belongs;

a calendar information storage device for storing calendar information;

a display device for display a GUI screen containing a plurality of components;

an input device for designating an arbitrary position on the GUI screen and entering an operation relative to the designated position on the GUI screen; and an inter-component communication control unit for, if a movable software component on a certain component constituting the GUI screen is selected with said input device and is moved and superposed upon another component constituting the GUI screen, notifying the motion destination other component of the superposed software component;

wherein the components constituting the GUI screen include:

a calendar component for temporarily storing calendar information acquired from said calendar information storage device in a calendar information storage area of said calendar component, displaying a software component indicating the date in a calendar format on the GUI screen in accordance with the acquired calendar information, and selecting, if another software component is superposed upon the software component by said input device, a process in accordance with a type of the other software component;

a schedule display area component for temporarily storing scheduling data acquired from said scheduling data storage device in a scheduling data storage area of said schedule display area component, graphically displaying a software component indicating the scheduling data in a corresponding area of a schedule screen constituted of a time axis and a member axis, in accordance with the acquired scheduling data, and selecting, if another software component is superposed upon the software component by said input device, a process in accordance with a type of the other software component; and a member select component for temporarily storing member information acquired from said member information storage device in a member information storage area of said member select component, hierarchically displaying a software component indicating the member on the GUI screen in accordance with the acquired member information, and selecting, if another software component is superposed upon the software component by said input device such as a pointing device, a process in accordance with a type of the other software component;

wherein if the software component indicating the date on said calendar component is superposed upon said schedule display area component by said input device such as a pointing device, said inter-component communication control unit supplies information of the software component from said calendar component to said schedule display area component, and said schedule display are a component judges that the software component is a software component of a type that indicates the date, to thereby select a process of referring to the scheduling data of the designated date;

if the software component indicating the member on said member select component is superposed upon said schedule display area component by said input device such as a pointing device, said inter-component communication control unit supplies information of the software component from said member select component to said schedule display area component, and said schedule display area component judges that the software component is a software component of a type that indicates the member, to thereby select a process of referring to the scheduling data of the member and judge from the information of the software component whether the member is an individual or a group to perform the selected process; and if the software component indicating the scheduling data displayed on the schedule screen on said schedule display area component is superposed upon said member select component by said input device such as a pointing device, said inter-component communication control unit supplies information of the software component from said schedule display area component to said member select component, and said member select component judges that the software component is a software component of a type that indicates the scheduling data, to thereby select a process of registering scheduling data having contents same as the scheduling data in the member selected by said member select component.

3. A scheduling management system, comprising:

a scheduling data storage device for storing scheduling data including a date, a time, and a work matter;

a member information storage device for storing member information including a user ID, a user name, a flag indicating whether the member is an individual or a group, and ID information of a hierarchical level the member belongs;

a calendar information storage device for storing calendar information;

a display device for display a GUI screen containing a plurality of components;

an input device for designating an arbitrary position on the GUI screen and entering an operation relative to the designated position on the GUI screen; and an inter-component communication control unit for, if a movable software component on a certain component constituting the GUI screen is selected with said input device and is moved and superposed upon another component constituting the GUI screen, notifying the motion destination other component of the superposed software component;

wherein the components constituting the GUI screen include:

a calendar component for temporarily storing calendar information acquired from said calendar information storage device in a calendar information storage area of said calendar component, displaying a software component indicating the date in a calendar format on the GUI screen in accordance with the acquired calendar information, and selecting, if another software component is superposed upon the software component by said input device, a process in accordance with a type of the other software component;

a schedule display area component for temporarily storing scheduling data acquired from said scheduling data storage device in a scheduling data storage area of said schedule display area component, graphically displaying a software component indicating the scheduling data in a corresponding area of a schedule screen constituted of a time axis and a member axis, in accordance with the acquired scheduling data, and selecting, if another software component is superposed upon the software component by said input device, a process in accordance with a type of the other software component; and a visiting site/work matter incorporating component for acquiring visiting site information and work matter information which is part of the scheduling data from a visiting site/work matter information storage device, and selecting, if the software component is superposed upon any one of the components constituting the GUI screen by said input device such as a pointing device, a process in accordance with a type of the software component;

wherein if the software component indicating the date on said calendar component is superposed upon said schedule display area component by said input device such as a pointing device, said inter-component communication control unit supplies information of the software component from said calendar component to said schedule display area component, and said schedule display are a component judges that the software component is a software component of a type that indicates the date, to thereby select a process of referring to the scheduling data of the designated date;

if the software component indicating the visiting site information on said visiting site/work matter incorporating component is superposed upon said schedule display are a component by said input device such as a pointing device, said inter-component communication control unit supplies information of the software component from said visiting site/work matter incorporating component to said schedule display area component, and said schedule display area component judges that the software component is a software component of a type that indicates the visiting site information, to thereby select a process of setting the visiting site information indicated by the software component to a visiting site of the scheduling data to be newly registered;

if the software component indicating the work matter information on said visiting site/work matter incorporating component is superposed upon said schedule display area component by said input device such as a pointing device, said inter-component communication control unit supplies information of the software component from said visiting site/work matter incorporating component to said schedule display area component, and said schedule display component judges that the software component is a software component of a type that indicates the work matter information, to thereby select a process of setting the work matter information indicated by the software component in a work matter of the scheduling data to be newly registered; and if the software component indicating the scheduling data on said schedule display area component is superposed upon said visiting site/work matter incorporating component by said input device such as a pointing device, said inter-component communication control unit supplies information of the software component from said schedule display area component to said visiting site/work matter incorporating component, and said visiting site/work matter incorporating component judges that the software component is a software component of a type that indicates the scheduling data, to thereby select a process of newly registering the visiting site information and the work matter information owned by the software component.

* * * * *